(12) United States Patent
Brück et al.

(10) Patent No.: US 12,201,941 B2
(45) Date of Patent: Jan. 21, 2025

(54) ANNULAR CATALYTIC CONVERTER

(71) Applicant: Vitesco Technologies GMBH, Regensburg (DE)

(72) Inventors: Rolf Brück, Bergisch Gladbach (DE); Peter Hirth, Rösrath (DE); Sven Schepers, Troisdorf (DE); David Odenthal, Bergisch Gladbach (DE); Marat Karibayev, Lohmar (DE); Ferdi Kurth, Mechernich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 547 days.

(21) Appl. No.: 17/526,184

(22) Filed: Nov. 15, 2021

(65) Prior Publication Data
US 2022/0072474 A1   Mar. 10, 2022

Related U.S. Application Data

(63) Continuation of application No. PCT/EP2020/063629, filed on May 15, 2020.

(30) Foreign Application Priority Data

May 15, 2019  (DE) ............... 10 2019 207 065.5

(51) Int. Cl.
*B01D 53/94*  (2006.01)
*B01J 35/56*  (2024.01)
(Continued)

(52) U.S. Cl.
CPC ............. *B01D 53/94* (2013.01); *B01J 35/56* (2024.01); *F01N 3/10* (2013.01);
(Continued)

(58) Field of Classification Search
CPC .. B01D 53/94; B01D 2255/9155; B01J 35/56; F01N 3/04; F01N 3/10;
(Continued)

(56) References Cited

U.S. PATENT DOCUMENTS 3,899,303 A * 8/1975 Gaysert ................. F01N 3/306
                                                                422/177
4,094,645 A   6/1978 Bailey
(Continued)

FOREIGN PATENT DOCUMENTS

CN        1809688 A     7/2006
CN      104653259 A     5/2015
(Continued)

OTHER PUBLICATIONS

International Search Report and Written Opinion dated May 15, 2020 from corresponding International Patent Application No. PCT/EP2020/063629.
(Continued)

*Primary Examiner* — Audrey B. Walter

(57) ABSTRACT

An annular catalytic converter, having a first, tubular flow path, having a diverting region and having a second, annular flow path, wherein the tubular flow path is formed by an inner pipe, wherein the annular flow path is formed between the inner pipe and an outer pipe surrounding the inner pipe, and the diverting region is of pot-shaped form for the purposes of diverting the exhaust-gas flow from the tubular flow path into the annular flow path, wherein the inner pipe and/or the outer pipe has a conical cross section that widens or narrows along the flow direction of the exhaust gas.

12 Claims, 2 Drawing Sheets

(51) Int. Cl.
*F01N 3/04* (2006.01)
*F01N 3/10* (2006.01)
*F01N 3/28* (2006.01)

(52) U.S. Cl.
CPC ........ *B01D 2255/9155* (2013.01); *F01N 3/04* (2013.01); *F01N 3/2803* (2013.01); *F01N 2240/20* (2013.01); *F01N 2470/24* (2013.01); *F01N 2490/06* (2013.01)

(58) Field of Classification Search
CPC ............... F01N 3/2803; F01N 2240/20; F01N 2470/24; F01N 2490/06
See application file for complete search history.

(56) References Cited

U.S. PATENT DOCUMENTS

| | | |
|---|---|---|
| 5,103,641 A | 4/1992 | Maus |
| 6,312,650 B1 | 11/2001 | Frederiksen |
| 7,849,676 B2 | 12/2010 | Witte-Merl |
| 8,978,366 B2 | 3/2015 | Brugger |
| 9,376,951 B2 | 6/2016 | Laurell et al. |
| 11,053,826 B2 | 7/2021 | Brugger et al. |
| 2006/0107656 A1 | 5/2006 | Rolf |
| 2007/0062190 A1 | 3/2007 | Melchior |
| 2013/0098002 A1 | 4/2013 | Danckert |
| 2014/0311133 A1* | 10/2014 | Norling ..................... F01N 5/02 60/286 |
| 2015/0152767 A1 | 6/2015 | Laurell |
| 2019/0112961 A1 | 4/2019 | Gaiser |

FOREIGN PATENT DOCUMENTS

| | | | |
|---|---|---|---|
| CN | 109667645 A | 4/2019 | |
| DE | 19955013 A1 | 5/2001 | |
| DE | 102010034705 A1 | 2/2012 | |
| DE | 102017205159 A1 | 9/2018 | |
| DE | 102017110685 A1 * | 11/2018 | ......... B01D 53/9418 |
| EP | 1890016 A2 | 2/2008 | |
| EP | 2873821 A1 | 5/2015 | |
| WO | 8902978 A1 | 4/1989 | |
| WO | 9743528 A1 | 11/1997 | |

OTHER PUBLICATIONS

German Office Action dated Mar. 27, 2020 for corresponding German Patent Application No. 10 2019 207 065.5.
Chinese Office Action dated Mar. 31, 2023 for corresponding Chinese Patent Application No. 202080032119.0.

* cited by examiner

ANNULAR CATALYTIC CONVERTER

CROSS-REFERENCE TO RELATED APPLICATIONS

This application claims priority to PCT Application PCT/EP2020/063629, filed May 15, 2020, which claims priority to German Patent Application No. DE 10 2019 207 065.5, filed May 15, 2019. The disclosures of the above applications are incorporated herein by reference.

FIELD OF THE INVENTION

The invention relates to an annular catalytic converter, having a first, tubular flow path, having a diverting region and having a second, annular flow path, wherein the tubular flow path is formed by an inner pipe, wherein the annular flow path is formed between the inner pipe and an outer pipe surrounding the inner pipe, and the diverting region is of pot-shaped form for the purposes of diverting the exhaust-gas flow from the tubular flow path into the annular flow path.

BACKGROUND OF THE INVENTION

So-called annular catalytic converters are used for the purposes of exhaust-gas aftertreatment in particular when the available installation space is limited and it is nevertheless sought to achieve as long a flow path as possible within the catalytic converter.

An annular catalytic converter has a central tubular flow path. The exhaust gas flows out of the tubular flow path into a diverting chamber, which effects a diversion of the exhaust gas outward in a radial direction and finally diverts the exhaust gas such that it flows, oppositely with respect to the flow direction in the tubular flow path by 180 degrees, through an annular flow path. Here, the tubular flow path and the annular flow path may for example be arranged concentrically with respect to one another. The annular flow path is delimited to the inside by the wall of the tubular flow path and to the outside by an outer pipe and/or a jacket.

Annular catalytic converters are used in particular in turbocharged internal combustion engines, directly downstream of the turbocharger. For optimum functioning of the catalytically active carrier matrices arranged in the annular flow path, the most uniform possible distribution of concentration and flow is advantageous.

A disadvantage of the devices from the prior art is in particular that no optimum uniform flow distribution and uniform concentration distribution are achieved at the catalytically active support matrices, resulting in non-optimal exhaust-gas aftertreatment.

SUMMARY OF THE INVENTION

The problem addressed by the present invention is therefore that of creating an annular catalytic converter which generates the most optimum possible uniform flow distribution at the inlet cross section of the catalytically active matrices.

The problem is solved with regard to the annular catalytic converter by an annular catalytic converter having the features described.

One exemplary embodiment of the invention relates to an annular catalytic converter, having a first, tubular flow path, having a diverting region and having a second, annular flow path, wherein the tubular flow path is formed by an inner pipe, wherein the annular flow path is formed between the inner pipe and an outer pipe surrounding the inner pipe, and the diverting region is of pot-shaped form for the purposes of diverting the exhaust-gas flow from the tubular flow path into the annular flow path, wherein the inner pipe and/or the outer pipe has a conical cross section that widens or narrows along the flow direction of the exhaust gas.

The inner pipe and the outer pipe may be arranged concentrically with one another or offset with respect to one another. In an embodiment, concentric arrangement is along the tubular flow path, to generate cross sections which in each case remain constant along the circumference.

Owing to the conicity of the inner pipe and/or of the outer pipe, various combinations are generated which, for example, lead to a tubular flow path that narrows or widens in the flow direction of the exhaust gas. The annular flow path may also narrow or widen in the flow direction of the exhaust gas. In a special configuration, the ring-shaped flow path may have a cross section that remains constant even in spite of the conical inner pipe and the conical outer pipe.

In an embodiment, the inner pipe has a cross section that widens conically in the flow direction of the exhaust gas and the outer pipe has a cross section that narrows in the flow direction of the exhaust gas.

The conical widening of the inner pipe improves the efficiency of an upstream turbocharger, because the enlargement of the cross section in the flow direction allows dynamic pressure to be converted into static pressure. This contributes to an improved effect of the turbocharger, whereby ultimately the efficiency of the internal combustion engine driving the turbocharger is improved.

The conical design of the outer pipe adapts the ratios of the cross-sectional areas from the gas inlet side of the annular flow path to the gas outlet side of the annular flow path such that differences in prestress in the matrix arranged in the annular flow path may be compensated. In this way, it is possible to prevent cell deformations in the matrix, and furthermore the undesired occurrence of holes or openings in the matrix. Overall, it is thus possible for the longevity of the annular catalytic converter to be significantly improved.

In an embodiment, the inner pipe and/or the outer pipe has an oval or an elliptical cross section. Oval or elliptical cross sections may be used the case of restricted installation space conditions. In this way, in the case of little installation space being available, the largest possible volume of the catalytic converter and of the catalytically active matrices is achieved.

An embodiment is characterized in that the inner pipe and the outer pipe have the length (L) and the tubular flow path has a cross-sectional area (D1) at its gas inlet side and the annular flow path has a cross-sectional area (D2) at its gas outlet side, wherein the tubular flow path widens conically from its gas inlet side to its gas outlet side with the angle ($\alpha 1$) and the annular flow path narrows conically from its gas inlet side to its gas outlet side with the angle ($\alpha 2$).

Assuming identical angles of $\alpha 1$ and $\alpha 2$, this generates walls of the inner pipe and of the outer pipe which run parallel to one another. If the angles $\alpha 1$ and $\alpha 2$ are configured to differ, this thus also results in a conically narrowing or widening annular flow path.

In an embodiment, the size ratio of the annular catalytic converter is defined by the formula $$\tan(\alpha 2) = \frac{\sqrt{D2^2 - D1^2 + (D1 + (L*\tan(\alpha 1))^2} - D2}{L}$$

A design of the annular catalytic converter in accordance with the above formula yields an optimum result with regard to the prestress conditions in the annular catalytic converter, because a very homogeneous stress state may be achieved. This is owing to the size ratios of the cross-sectional areas, of the lengths and of the cell sizes of the matrices used.

In an embodiment, at least one matrix formed by a metallic honeycomb body is arranged in the annular flow path, wherein the matrix has a cross-sectional profile that follows the cross-sectional profile of the annular flow path. Depending on the application, a multiplicity of matrices may also be provided, which have different coatings in order to convert different constituents of the exhaust gas.

In an embodiment, the metallic honeycomb body is formed by a multiplicity of metallic foils which are stacked one on top of the other and which are wound up to form the honeycomb body, wherein at least some foils are corrugated, wherein the conicity of the metallic honeycomb body and thus of the matrix along its flow direction is influenced through variation of the corrugation height and of the corrugation density between the gas inlet side and the gas outlet side of the matrix. Metallic honeycomb bodies may be specially adapted in order to adapt them to the spatial conditions. In an embodiment, to avoid undesired flows around the honeycomb bodies, the honeycomb body is adapted to the geometry of the flow path and terminates flush with the walls of the flow path. The generation of conical honeycomb bodies is known and may be achieved by way of the measures mentioned above.

It is also expedient if the diverting region has a cooling device. For example, the cooling device may be formed by a double-walled section, which is flowed through by a coolant, of the diverting region. This double-walled section may be formed in certain regions or throughout the entire diverting region. For example, double-walled sections may also be formed by channels which are formed in the wall of the diverting region and which is flowed through by a coolant. The throughflow may be regulated for example by a wastegate or a bimetal.

Alternatively, the cooling device may be formed by a cooling coil arranged at or in the diverting region. A cooling coil is formed by a closed volume, for example a hose or a pipe, which is flowed through by a coolant, and may be arranged at the locations to be cooled. The cooling device may additionally have ribs which project into the diverting region or which project outwardly away from the diverting region.

As a result of the cooling of the diverting region, it is possible to operate with the combustion air ratio of $\lambda=1$ for longer, and thus to reduce the exhaust-gas emissions. This is because, as a result of the cooling, the exhaust-gas mass flow upstream of the catalytically active matrix is cooled such that, at high load points of the internal combustion engine, it is possible to operate with $\lambda=1$ for longer without the temperatures of the exhaust gas and of the affected components becoming too high and the structural integrity of the annular catalytic converter being jeopardized.

Furthermore, as a result of the cooling of the diverting region, the viscosity of the exhaust-gas flow in the region close to the wall may be reduced. As a result of a lowering of the viscosity and thus of the resulting friction, the pressure loss that occurs in the throughflow is reduced.

In an embodiment, the inner pipe has, at the gas outlet side of the tubular flow path and at the gas inlet side of the annular flow path, a guide element by which the exhaust-gas flow flowing through the annular catalytic converter is diverted. Because of a guide element, the flow, which is diverted in the diverting region after flowing through the gas outlet side of the tubular flow path and before flowing through the gas inlet side of the annular flow path, may be diverted into a certain direction, and the mixing of the gas flow is influenced. A guide element may be designed as an additional component which is arranged on one of the inner walls, or may also be an integral part of one of the walls.

In an embodiment, the guide element is generated by a bead-like bend of the free end of the inner pipe radially outward and into the annular flow path. No additional components are required, and the production process is thus simple. Bends with a small radius, which could result in the generation of separation edges that may adversely affect the flow of the exhaust gas, are avoided by the use of a bead-like bend.

In an embodiment, an optimized incident flow onto a matrix arranged in the annular flow path is achieved by the inner wall of the diverting region in conjunction with the guide element on the inner pipe. This achieves as homogeneous a flow distribution as possible and as homogeneous a concentration distribution as possible over the cross-sectional area of the catalytically active matrix.

Other developments of the present invention are described in the following description of the Figures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be discussed in more detail below on the basis of exemplary embodiments with reference to the drawings. In the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
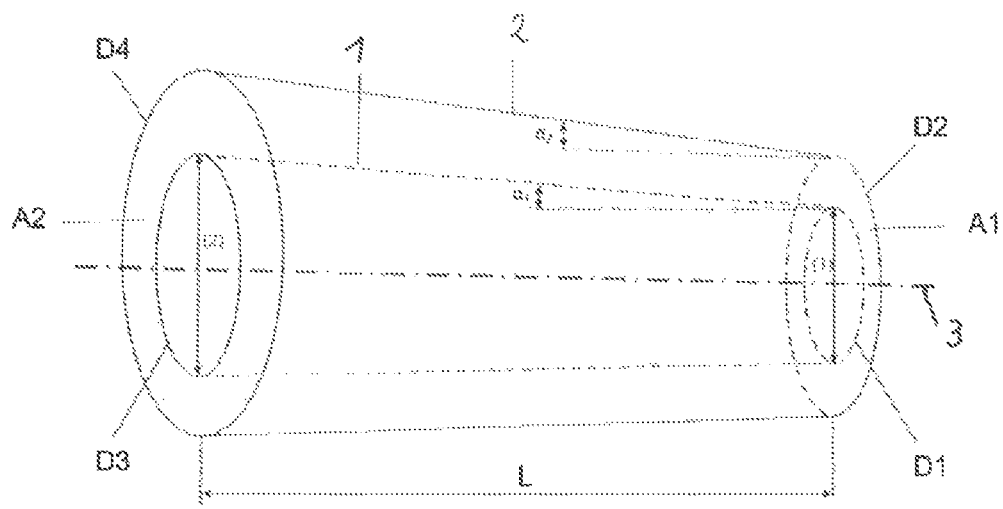
FIG. 1 shows a schematic view of the inner pipe and of the outer pipe of an annular catalytic converter for the purposes of illustrating the different cross-sectional areas and angles.

FIG. 1 shows a schematic view of the inner pipe 2, which is surrounded by the outer pipe 2. The two pipes 1 and 2 are oriented concentrically around the central axis 3. The cross-sectional area D1 is shown at the gas inlet side of the inner pipe 1, whereas the cross-sectional area D3 is illustrated at the gas outlet side of the inner pipe 1. The cross-sectional area D4 or the differential area A2 between the cross-sectional areas D3 and D4 is shown at the gas inlet side of the annular flow path which is formed between the inner pipe 1 and the outer pipe 2. The differential area A1 between the cross-sectional areas D1 and D2 is shown at the gas outlet side of the annular flow path.

The inner pipe 1 widens from the gas inlet side to the gas outlet side by the angle α1 with respect to the central axis 3. The outer pipe widens from its gas outlet side to its gas inlet side by the angle α2 with respect to the central axis.

The throughflow sequence is from the gas inlet side of the inner pipe 1 to the gas outlet side of the inner pipe 1, where, in the diverting region not shown in FIG. 1, the exhaust gas is diverted into the gas inlet side of the outer pipe 2 or of the annular flow path. From there, the exhaust gas flows to the gas outlet side of the annular flow path or of the outer pipe 2.

The pipes 1, 2 have a length L which, in the exemplary embodiment in FIG. 1, is identical for both pipes 1, 2.

A variation of the angles α1 and α2 leads to different geometries for the tubular flow path and the annular flow path. In an embodiment, the annular flow path may have a cross section that remains constant along the flow direction, or a varying cross section.

Figure 2:
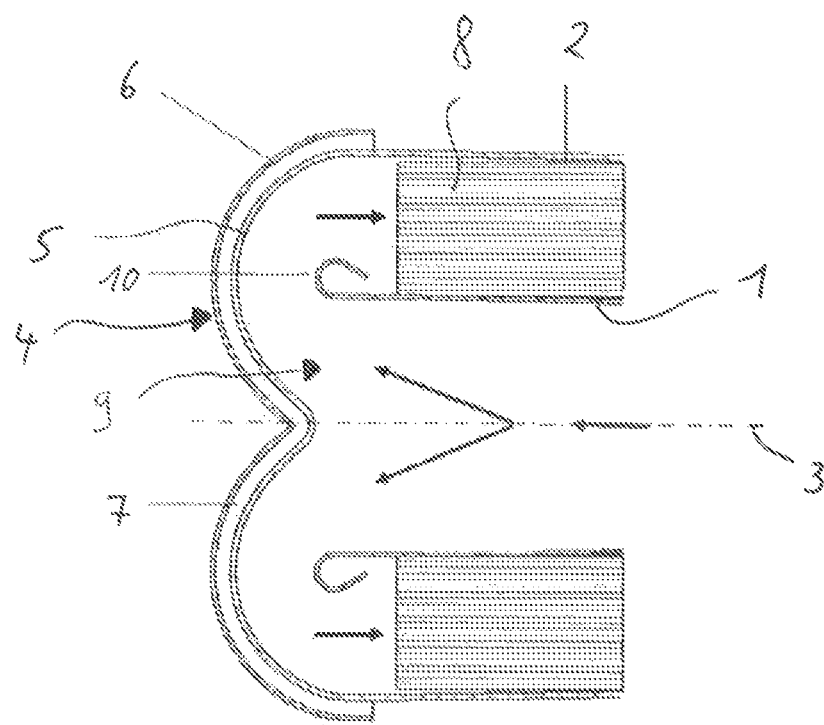
FIG. 2 shows a schematic sectional view through the annular catalytic converter, wherein the diverting region is of double-walled design and is flowed through by a coolant.

FIG. 2 shows a view of the gas outlet side of the tubular flow path, and the diverting region 4 adjoining the gas outlet side. The diverting region 4 is formed by a pot-shaped wall 5, which serves as a baffle wall for the inflowing exhaust gas and which ultimately serves to divert the exhaust gas outward in a radial direction and ultimately into the annular flow path.

As may be seen from the arrows in FIG. 2, the main flow direction in the tubular flow path is opposite to the main flow direction in the annular flow path.

Also shown is a second wall 6, which follows the profile of the inner wall 5 and which thus forms a region 7 through which flow may pass, for example a channel or some other closed volume through which flow may pass. This may be flowed through by a coolant, and thermal energy is thus dissipated from the exhaust gas via the inner wall 5.

The free end of the inner pipe 1 furthermore has a bead-like bend radially outward and into the annular flow path. This generates the guide element 10, which is intended to improve the exhaust-gas flow in the volume 9 enclosed by the diverting region 4. The guide element 10 is configured to be of fully encircling form in a radial direction.

Figure 3:
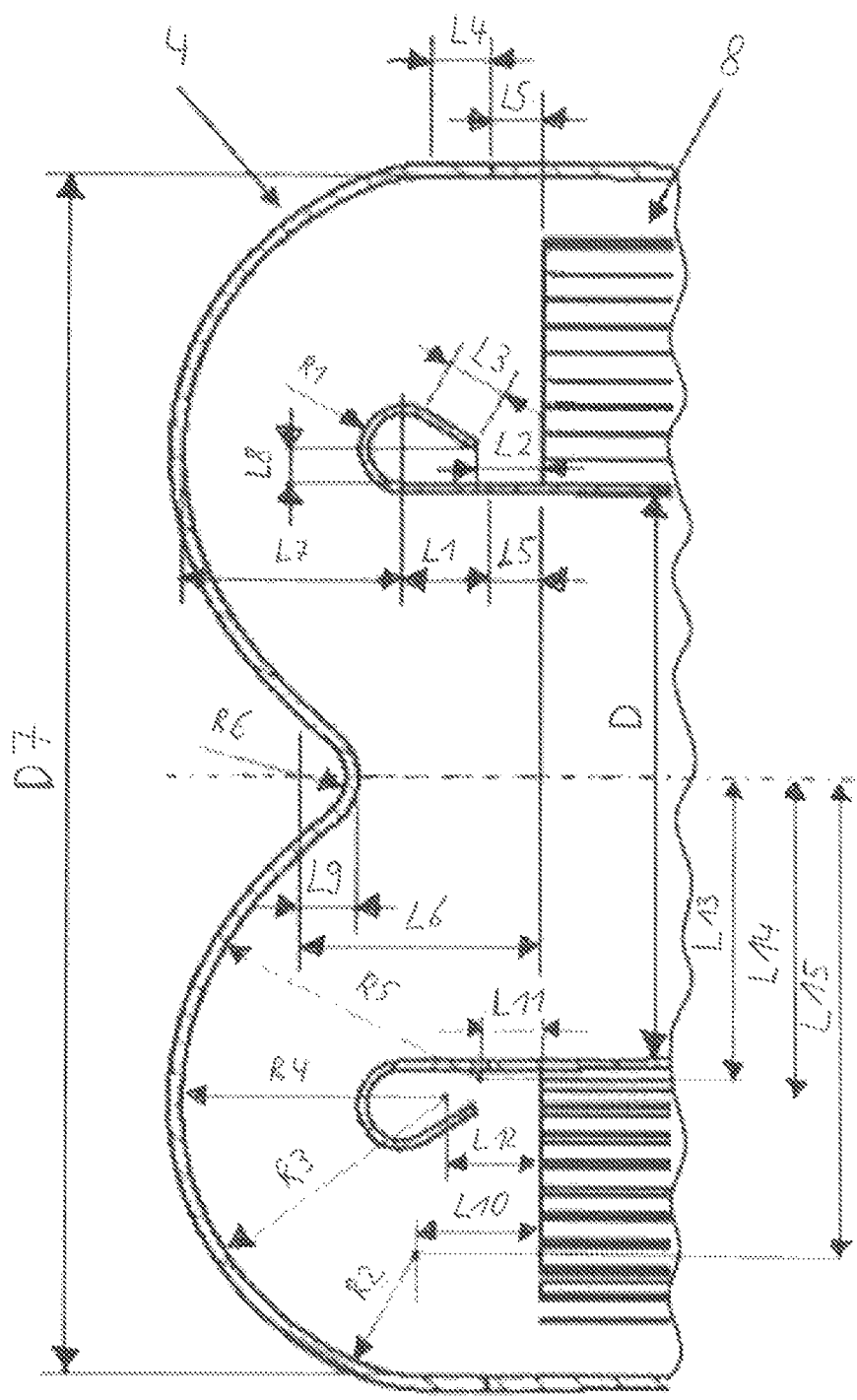
FIG. 3 shows a detail view of the diverting region and of the guide element formed on the inner pipe.

FIG. 3 shows a detail view of the diverting region 4 and the size ratios of the inner wall 5 and the guide element 10 in relation to the diameter D of the tubular flow path at its gas outlet. A diverting region 4 and a guide element 10 which have dimensions within the magnitudes specified in the table below generate the most homogeneous flow possible at the gas inlet of the annular flow path or of the catalytically active matrix 8.

$0.0153 \leq R1/D \geq 3.450$
$0.0153 \leq R2/D \geq 3.461$
$0.0076 \leq R3/D \geq 3.461$
$0.0076 \leq R4/D \geq 3.461$
$0.0153 \leq R5/D \geq 3.461$
$0.0153 \leq R6/D \geq 3.461$
$1.100 \leq D7/D \geq 3.461$
$0.0153 \leq L1/D \geq 3.384$
$0.0076 \leq L2/D \geq 3.384$
$0.0153 \leq L3/D \geq 3.384$
$0.0153 \leq L4/D \geq 3.438$
$0.0153 \leq L5/D \geq 3.438$
$0.0000 \leq L6/D \geq 3.469$
$0.0153 \leq L7/D \geq 3.4446$
$0.0153 \leq L8/D \geq 3.450$
$0.0153 \leq L9/D \geq 4.230$
$0.0460 \leq L10/D \geq 3.461$
$0.0460 \leq L11/D \geq 3.461$
$0.0460 \leq L12/D \geq 3.461$
$0.0153 \leq L13/D \geq 3.461$
$0.0153 \leq L14/D \geq 3.461$
$0.0153 \leq L15/D \geq 3.461$ Here, the free end of the inner pipe is bent outward and does not come back into contact with the outer side of the inner pipe. Here, the reference designations L1 to L15 each denote lengths of individual sections. The reference designations R1 to R6 denote different radii of the components. The reference designation D denotes the diameter of the inner pipe at its gas outlet side and the reference designation D7 denotes the diameter of the outer pipe at its gas inlet side.

The different features of the individual exemplary embodiments may also be combined with one another. The exemplary embodiments in FIGS. 1 to 3 are not of a limiting nature and serve for illustrating the concept of the invention.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. An annular catalytic converter, comprising:
   an inner pipe;
   an outer pipe, the inner pipe and the outer pipe are the same length;
   a tubular flow path formed by the inner pipe;
   an annular flow path formed between the inner pipe and the outer pipe, and surrounding the inner pipe; and
   a diverting region for diverting exhaust-gas flow from the tubular flow path into the annular flow path, the diverting region having pot-shaped form;
   a first cross-sectional area at the gas inlet side of the tubular flow path;
   a second cross-sectional area at the gas outlet side of the annular flow path;
   a third cross-sectional area at the gas outlet side of the tubular flow path; and
   a fourth cross-sectional area at the gas inlet side of the annular flow path;
   wherein each of the inner pipe and the outer pipe are conically-shaped, which widen or narrow along the flow direction of the exhaust gas, such that the tubular flow path widens conically from its gas inlet side to its gas outlet side by a first angle, and the annular flow path narrows conically from its gas inlet side to its gas outlet side by a second angle.

2. The annular catalytic converter of claim 1, the inner pipe further comprising a cross section that widens conically in the flow direction of the exhaust gas and the outer pipe.

3. The annular catalytic converter of claim 1, the outer pipe further comprising a cross section that narrows in the flow direction of the exhaust gas.

4. The annular catalytic converter of claim 1, wherein at least one of the inner pipe or the outer pipe has an oval or an elliptical cross section.

5. The annular catalytic converter of claim 1, wherein a size ratio of the annular catalytic converter is defined by the formula $$\tan(\alpha 2) = \frac{\sqrt{D2^2 - D1^2 + (D1 + (L*\tan(\alpha 1))^2} - D2}{L}.$$

6. The annular catalytic converter of claim 1, further comprising at least one matrix having a metallic honeycomb body arranged in the annular flow path, wherein the matrix has a cross-sectional profile that follows the cross-sectional profile of the annular flow path.

7. The annular catalytic converter of claim 6, the metallic honeycomb body further comprising:
- a multiplicity of metallic foils which are stacked one on top of the other and which are wound up to form the honeycomb body, at least a portion of the multiplicity of metallic foils are corrugated;
- wherein the conicity of the metallic honeycomb body and thus of the matrix along its flow direction are influenced through variation of the corrugation height and of the corrugation density between the gas inlet side and the gas outlet side of the matrix.

8. The annular catalytic converter of claim 6, wherein an optimized incident flow onto the at least one matrix arranged in the annular flow path is achieved by an inner wall of the diverting region in conjunction with a guide element on the inner pipe.

9. The annular catalytic converter of claim 1, the diverting region further comprising a cooling device.

10. The annular catalytic converter of claim 9, the cooling device further comprising a double-walled section, which is flowed through by a coolant, of the diverting region.

11. The annular catalytic converter of claim 1, the inner pipe further comprising:
- at least one guide element located at the gas outlet side of the tubular flow path and at the gas inlet side of the annular flow path;
- wherein the exhaust-gas flow flowing through the annular catalytic converter is diverted by the at least one guide element.

12. The annular catalytic converter of claim 11, the at least one guide element further comprising a bead-like bend of a free end of the inner pipe radially outward and into the annular flow path.

\* \* \* \* \*